(12) United States Patent
Yee et al.

(10) Patent No.: US 12,361,260 B2
(45) Date of Patent: Jul. 15, 2025

(54) DETERMINING AT LEAST ONE NODE

(71) Applicant: Siemens Aktiengesellschaft, Munich (DE)

(72) Inventors: Dianna Yee, Munich (DE); Mitchell Joblin, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1172 days.

(21) Appl. No.: 17/082,366

(22) Filed: Oct. 28, 2020

(65) Prior Publication Data
US 2022/0129733 A1 Apr. 28, 2022

(51) Int. Cl.
*G06N 3/045* (2023.01)
*G06F 16/901* (2019.01)
*G06F 18/2413* (2023.01)
*G06N 3/063* (2023.01)
*G06N 5/022* (2023.01)

(52) U.S. Cl.
CPC ......... *G06N 3/045* (2023.01); *G06F 16/9024* (2019.01); *G06F 18/24147* (2023.01); *G06N 3/063* (2013.01); *G06N 5/022* (2013.01)

(58) Field of Classification Search
CPC ........ G06N 3/045; G06N 3/063; G06N 5/022; G06F 16/9024; G06F 18/24147
See application file for complete search history.

(56) References Cited

U.S. PATENT DOCUMENTS 11,481,603 B1 * 10/2022 Newman ............... G06N 3/042
11,555,706 B1 * 1/2023 Levihn ............... G05D 1/0088
(Continued)

FOREIGN PATENT DOCUMENTS

CN 109977232 A * 7/2019

OTHER PUBLICATIONS

Jacob et al. "Learning latnet representations of nodes for classifying in heterogeneous social networks." Feb. 24, 2014. WDSM '14: Proceedings of the 7th ACM international conference on Web search and data mining. pp. 373-382.*

(Continued)

*Primary Examiner* — Marshall L Werner
(74) *Attorney, Agent, or Firm* — Schmeiser, Olsen & Watts LLP

(57) ABSTRACT

A method including providing a graph database representation, wherein the graph database representation represents a plurality of nodes in a graph which are interconnected by respective edges, wherein each node of the plurality of the nodes represents a data sample and is assigned to at least one node feature, wherein each edge of the plurality of the edges represents a relationship between the data samples, transforming the graph database representation into a data matrix using a first machine learning algorithm suitable for graph data and an architecture as first layers of a joint machine learning architecture, determining at least one node of the plurality of nodes based on the transformed data matrix using a second machine learning algorithm and a second architecture as second layers of a joint machine learning architecture, and providing the at least one determined node. Further, a computing unit and a computer program product is provided.

10 Claims, 2 Drawing Sheets

(56) References Cited

U.S. PATENT DOCUMENTS

Figure 1:
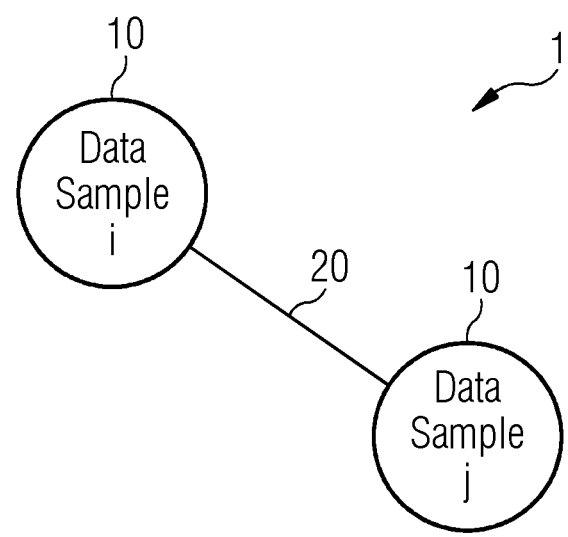

| | | | |
|---|---|---|---|
| 2013/0117207 A1* | 5/2013 | Kim | G06N 3/08 |
| | | | 706/20 |
| 2020/0387355 A1* | 12/2020 | Balan | G06F 7/78 |
| 2021/0288976 A1* | 9/2021 | Huang | G06N 3/045 |
| 2024/0054328 A1* | 2/2024 | Li | G06N 3/047 |

OTHER PUBLICATIONS

Jacob et al., Learning Latent Representations of Nodes for Classifying in Heterogeneous Social Networks, WSDM '14: Proceedings of the 7th ACM international conference on Web search and data mining, pp. 373-382, Feb. 2014. (Year: 2014).*

* cited by examiner

DETERMINING AT LEAST ONE NODE

1. FIELD OF TECHNOLOGY

The present invention relates to a computer-implemented method for determining at least one node. Further, the invention relates to a corresponding computing unit and computer program product.

2. BACKGROUND

Increasing digitalization and automation of processes have driven the need for labelled data. For example, business units in e.g. context of Industry 4.0 or other technical fields require labelled data. The labelled data is necessary for diverse machine learning tasks, including supervised machine learning.

Usually, prior art approaches resort to unsupervised machine learning due to the lack of labelled data. However, in this case, it is impossible to incorporate direct feedback from domain experts. Hence, it cannot be ensured that the machine learning model predictions are coherent to domain expert opinions.

Therefore, according to prior art, domain experts have to provide the labelled data resulting in manual effort to overcome such limitations. Alternatively, the manual labelling effort can be commissioned, but often this is a challenging task, as it still relies on the domain expert to select the relevant samples to label which will be useful for the machine learning models.

The disadvantage is that the manual labelling effort by domain experts is time-consuming and expensive. In other words, it is resource intensive to have the domain expert label all data and domain experts often lack the knowledge on how to select relevant samples from the data to label.

Moreover, during the productive phase of the machine learning models, even more unlabelled data will be generated. The need for labelling uncertain observations will be necessary in order to monitor and trigger re-training of the machine learning models. Retraining is needed such that the new models are adjusted to account for any deviation between the current environment and the environment during training time.

It is therefore an objective of the invention to provide a computer-implemented method for determining at least one node in an efficient and reliable manner.

3. SUMMARY

This problem is according to one aspect of the invention solved by computer-implemented method for determining at least one node; comprising the steps:
a. Providing a graph database representation; wherein the graph database representation represents a plurality of nodes in a graph which are interconnected by respective edges; wherein
each node of the plurality of the nodes represents a data sample and is assigned to at least one node feature; wherein
each edge of the plurality of the edges represents a relationship between the data samples;
b. Transforming the graph database representation into a data matrix using a first machine learning algorithm and a first architecture suitable for graph data as first layers of a joint machine learning architecture;
c. Determining at least one node of the plurality of nodes based on the transformed data matrix using a second machine learning algorithm and a second architecture as second layers of a joint machine learning architecture; and
d. Providing the at least one determined node.

In the first step a., the graph database representation is provided or received as input for the next method step b. Preferably, the graph database is a knowledge graph with nodes representing the entities and edges representing the relationships, connections or links. Each node is assigned to a single node feature or a plurality of features.

In other words, the node features are provided as additional input. These features describe the data samples. This way, context information can be considered. These node features can be referred to as meta-data describing attributes or features of the data sample. Thereby, the meta-data can be any data, preferably generated by a machine learning ("ML") model. For example, the node features can include e.g. the predicted label, whether it has a ground truth label or not, what the ground truth label is, the uncertainty of the model prediction and latent features of the data sample (e.g. obtained by the ML model).

The links or relationships between the data samples in the knowledge graph are formalized using a similarity measure between data samples, such as similarity in the latent representation given by the ML model. Nodes which are similar enough are linked together using a threshold, preferably a k nearest neighbor heuristic. Therefore, the knowledge graph encodes the current state of the dataset given the current state of the ML model.

The input data sets can be received via one or more interfaces of a receiving unit e.g. from a data storage unit. The output data sets can be transmitted or sent via one or more interfaces of a transmitting unit, e.g. to a computing unit.

In the next step b., the provided graph database representation is transformed into a data matrix using machine learning and according architecture, applicable on graphs. Therefore, preferably a machine learning model is used, which is applicable on a graph structure preferably a neural network. Referring to graph neural networks, the weights of the neural network are trained to learn a transformation such that each node in the input graph data can be represented as a latent feature vector. The latent feature vectors are computed using the neural network weights which are optimized to learn local spatial patterns within the graph and which are useful for the learning task e.g. preferably for the nomination of a node for labelling. Thereby, the graph neural network allows for feature learning (extracting useful patterns in the input graph) of latent node representations. These latent node representations are intermediate results which are used as inputs for determining whether a data sample should be further processed in step c.

In the next step c., the at least one node is determined on the basis of the data matrix using machine learning and according architecture. Therefore, preferably a machine learning model is used, which is applicable on a data matrix.

Accordingly, two sub-architectures are used in the method according to the invention. The first layers of the first architecture use machine learning suitable for graphs for feature learning from the received graph database representation. The subsequent layers of the second architecture are used for determining the node nomination task from the data matrix.

The weights for the entire model, both machine learning algorithms or models, are jointly adjusted during training.

In step d., the at least one node is provided as output, representing at least one data sample. In other words, the method according to the invention enables to select or filter one or more data samples out of a plurality of data samples in the graph, especially unlabelled data samples. This determined data sample can be further handled, preferably labelled. This way, just a subset of data samples has to be labelled. Thus, the labelling task can be achieved in a more efficient and reliable manner without the requirement to label or handle all data samples.

Alternatively to labelling, the provided at least one data sample can be annotated etc., see further below. Thus, the method is flexible in view of the underlying task and requirements.

In one aspect the graph database representation is a knowledge graph, in particular k-nearest neighbor (KNN) graph.

In one aspect the first machine learning algorithm is a graph neural network (GNN). The GNN allows for flexible modeling of the received input data set, comprising data samples and their features of variable size. Further the GNN is capable to model inter-relations between the data samples. Hence, the GNN is an effective framework for machine learning which enables the information propagation between nodes. Thereby, the interdependency between a local neighborhood of nodes is also considered.

In other words, the use of the GNN ensures an active learning strategy which considers neighborhood information. This is in contrast to prior art.

In one aspect the data matrix is a node latent representation.

In one aspect the second machine learning algorithm is a neural network, in particular a multilayer perceptron. The advantage of the neural network is that it is simple and highly flexible in its architecture and suitable for learning a variety of regression or classification tasks.

In one aspect the method further comprises the step labelling the determined at least one node, annotating the determined at least one node and/or transmitting the at least one determined node.

Accordingly, the determined node can be further handled, as explained further above. One or more actions can be performed in a timely and efficient manner. Thereby, the action can be equally referred to as measure. The actions can be performed by one or more technical units, such as computing unit or robot unit. Alternatively, the actions can be performed by a user or oracle manually. In a preferred use case, the at least one node which represents a data sample is labelled. The advantage is that not all data samples have to be labelled in a time-consuming and error prone manner, but just the essential subset of data samples of the graph database representation. This way in other words, the prediction performance of the "ML" is maximized for minimal labelling efforts. Afterwards, the labelled data samples can be used to retrain the "ML" model.

A further aspect of the invention is a computing unit e.g. robot unit or other autonomous unit.

The unit may be realized as any devices, or any means, for computing, in particular for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the unit may be implemented by a cloud computing platform.

A further aspect of the invention is a computer program product directly loadable into an internal memory of a computer, comprising software code portions for performing the steps according to the aforementioned method when said computer program product is running on a computer.

4. BRIEF DESCRIPTION

Figure 2:
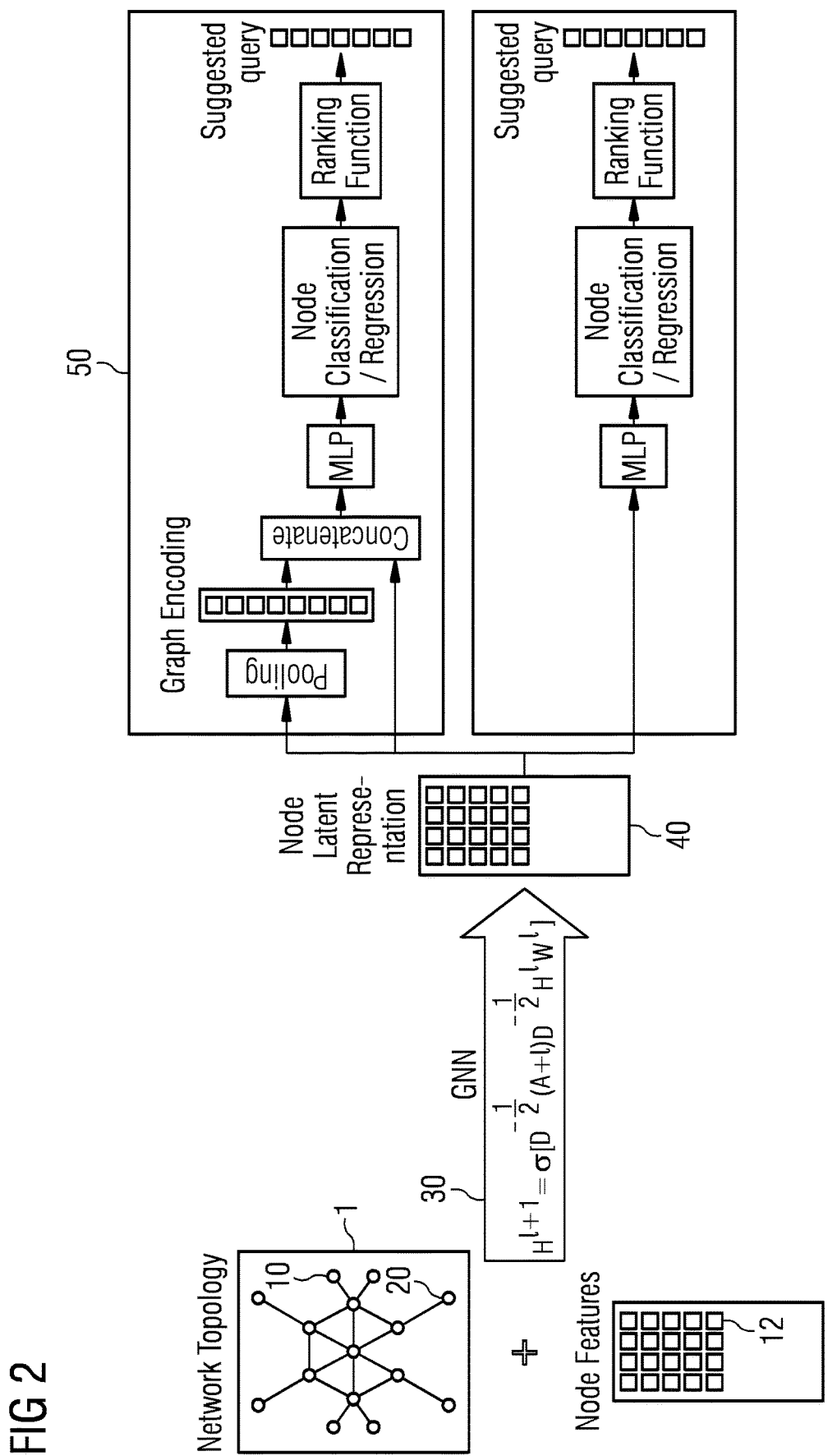

In the following detailed description, presently preferred embodiments of the invention are further described with reference to the following figures:

FIG. 1 illustrates a graph database representation as knowledge graph according to an embodiment of the invention; and FIG. 2 shows a schematic diagram of the method according to an embodiment including the machine learning algorithms.

5. DETAILED DESCRIPTION

Graph Database Representation

FIG. 1 illustrates a graph database representation 1 as knowledge graph according to an embodiment of the invention.

The illustrated knowledge graph 1 comprises nodes 10 representing data samples, node features 12, which are assigned to the nodes 10 describing the attributes or features of the data samples, and edges 20 which model the relationships between the data samples.

According to a preferred embodiment, the knowledge graph 1 is a k-nearest neighbor graph 1 which can be used to represent a data set in a compressed form. The k-nearest neighbor graph is computationally favorable for large data sets, where it can be computationally expensive to model intra-sample relationships within the entire data set. The data samples i an j are exemplary data samples in FIG. 1. They will be linked together, if they are most similar in the data set. Thereby, the similarity can be determined using various methods, such as cosine similarity and Euclidean-space based methods.

In other words, the links or relationships 20 between the data samples can be formalized using a similarity measure between the latent representation given by the "ML" model. Thereby, nodes 10 which are similar enough are linked together using a threshold or a k-nearest neighbor heuristic. Therefore, the knowledge graph 1 encodes the current state of the dataset given the current state of the "ML" model.

The node features 12 can be features generated by the machine learning model, see further above. Further examples of node features include:

Uncertainty of model prediction (i.e. entropy), label status (labelled or not), "ML" model predictions, "ML" model feature embeddings, metadata of data sample e.g. noise artifacts and origin of data.

Moreover, there are different possibilities for formulating edge 20 types, such as homogenous edges by thresholding and mean 'similar', weighted edges based on similarity for k-nearest most similar and/or most dissimilar and typed edges: high/med/low similarity, high/med/low dissimilarity.

The advantage of the knowledge graph 1 is that links or relationships 20 between the data samples are considered. This is in contrast to prior art, according to which they are neglected. This logical path can associate the unlabeled data sample to known labelled data samples which can be reviewed by the human for a richer context of where the machine learning model lacks information for sufficient inference. Furthermore, the convolutions are not limited to first order neighborhoods, but also possible for higher-order neighborhoods.

Transforming the graph database representation 1 into a data matrix 40 using a first machine learning algorithm 30

The graph database representation 1 is transformed into a data matrix 40 using machine learning algorithm 30. In a preferred embodiment a GNN is used. The GNN has proven to be advantageous since it is intrinsically invariant to permutations and able to share information via message passing.

More specifically, the GNN learns a node embedding for each data sample of the graph database representation which can then be combined in various methods for the second machine learning algorithm.

Alternatively, other neural networks can be applied on the graph database representation. The method according to the invention is flexible in view of machine learning models which are either semi- or fully supervised and can also be trained using few-shot learning strategies.

The resulting data matrix 40 can be a node latent representation.

Determining and providing at least one node 10 based on the transformed data matrix 40 using a second machine learning algorithm 50

Then, a second machine learning approach 50 is applied on the data matrix 40 to determine and provide the one or more nodes as output, representing selected data samples. In a preferred embodiment the second machine learning algorithm 50 is a neural network, also referred to as policy selection network.

According to an embodiment, the policy selection network considers a concatenation of the global graph embedding with the individual node embeddings to generate a score for each data sample. According to an alternative embodiment, the network simply computes a score using only the node embeddings. Regarding graph convolutional neural networks, the node embeddings for each data sample are computed using other data samples within its neighborhood within the graph. Hence, relationships between data samples are considered. This is in contrast to known methods.

Hence, in other words, the method according to the invention is directed to an active learning algorithm which uniquely combines reinforcement learning and graph neural network methods for improving the selection of unlabelled data samples for labelling.

The policy selection network can be trained to minimize labeling efforts while maximizing the improvement of the "ML" model's prediction performance after retraining.

Contrary to prior art, the active learning strategy is aware of the entire dataset, and therefore the strategy is more informed than traditional approaches to provide optimal query candidates for labeling.

The method according to the invention can be designed as model-agnostic and data agnostic without requiring any adaptation of the feature representations of the model to adhere to a fixed feature representation dimension depending on the definition of the node features. For example, policy selection network can use a scalar metric of similarity between feature representations of labelled and unlabeled observations as part of its state representation.

The trained policy selection network can also be applied to another use case by means of transfer learning, in the case where a similar infrastructure and problem setting exists. For example, the ML model can be reused for the same use case, but using data from or in a different region.

Training

The reinforcement learning approach can be used to train the active learning agent whose model architecture is outlined in the aforementioned method steps.

The model weights of the selection policy of the active learning agent is optimized to maximize a reward function. An example of a reward function would be the improvement of prediction performance of the "ML" model on a hold-out test dataset. Such prediction performance indicators may be accuracy, average error and other related measures. The agent can be trained in a simulation environment, wherein a sub-set of the labels of the training data set is artificially made not observable by the reinforcement learning agent or the "ML" model. The "ML" model is trained on a subset of the training data whose labels are observable, and the agent can explore and nominate a subset of data samples from the training data to be labeled. Through the selection of different data samples and subsequent observation of the corresponding reward, the agent learns an optimal selection strategy which maximizes the reward function.

REFERENCE SIGNS

1 graph database representation
10 node
12 node feature
20 edge
30 first machine learning algorithm
40 data matrix
50 second machine learning algorithm

The invention claimed is:
1. A computer-implemented method comprising:
a. providing a graph database representation; wherein
   the graph database representation represents a plurality of nodes in a graph which are interconnected by respective edges; wherein
   each node of the plurality of the nodes represents a data sample and is assigned to at least one node feature; wherein
   each edge of the plurality of the edges represents a relationship between the data samples;
b. inputting the graph database representation into a first neural network having a first machine learning algorithm suitable for graph data and a first architecture as first layers of a joint machine learning architecture, the first neural network transforming the graph database representation into a data matrix as an output of the first neural network;
c. inputting the output of the first neural network into a second neural network having a second machine learning algorithm and a second architecture as second layers of a joint machine learning architecture; and
d. outputting at least one determined node from the second neural network, wherein the second neural network considers a concatenation of a global graph embedding with individual node embeddings to generate a score for each data sample, and the node embeddings for each data sample are computed using other data samples within a neighborhood within the graph such that relationships between data samples are considered;
e. training the joint machine architecture using a reinforcement learning approach, in a simulation environment, wherein model weights of the second machine learning algorithm are optimized to maximize a reward function, and a subset of the labels of the training data set is artificially made not observable by the joint machine architecture or a machine learning model, the machine learning model being trained on a subset of the training data whose labels are observable, and the joint machine architecture explores and nominates a subset of data samples from the training data to be labeled, and through a selection of different data samples and subsequent observation of a corresponding reward, the joint machine architecture learns an optimal selection strategy which maximizes the reward function.

2. The computer-implemented method according to claim 1, wherein the graph database representation is a knowledge graph.

3. The computer-implemented method according to claim 2, wherein the knowledge graph is a k-nearest neighbor graph.

4. The computer-implemented method according to claim 1, wherein the first neural network is a graph neural network.

5. The computer-implemented method according to claim 1, wherein the data matrix is a node latent representation.

6. The computer-implemented method according to claim 1, wherein the second neural network is a multilayer perceptron.

7. The computer-implemented method according to claim 1, further comprising labelling the at least one determined node, annotating the at least one determined node and/or transmitting the at least one determined node.

8. The computer-implemented method according to claim 1, further comprising:
training the first architecture and the second architecture using the output of the first neural network and an output of the second neural network.

9. A computer system comprising:
a processor;
a memory operatively connected to the processor, wherein the processor is configured to:
a. provide a graph database representation; wherein
the graph database representation represents a plurality of nodes in a graph which are interconnected by respective edges; wherein
each node of the plurality of the nodes represents a data sample and is assigned to at least one node feature; wherein
each edge of the plurality of the edges represents a relationship between the data samples;
b. input the graph database representation into a first neural network having a first machine learning algorithm suitable for graph data and a first architecture as first layers of a joint machine learning architecture, the first neural network transforming the graph database representation into a data matrix as an output of the first neural network;
c. input the output of the first neural network into a second neural network having a second machine learning algorithm and a second architecture as second layers of a joint machine learning architecture; and
d. output at least one determined node from the second neural network, wherein the second neural network considers a concatenation of a global graph embedding with individual node embeddings to generate a score for each data sample, and the node embeddings for each data sample are computed using other data samples within a neighborhood within the graph such that relationships between data samples are considered;
e. train the joint machine architecture using a reinforcement learning approach, in a simulation environment, wherein model weights of the second machine learning algorithm are optimized to maximize a reward function, and a subset of the labels of the training data set is artificially made not observable by the joint machine architecture or a machine learning model, the machine learning model being trained on a subset of the training data whose labels are observable, and the joint machine architecture explores and nominates a subset of data samples from the training data to be labeled, and through a selection of different data samples and subsequent observation of a corresponding reward, the joint machine architecture learns an optimal selection strategy which maximizes the reward function.

10. A non-transitory computer program product directly loadable into an internal memory of a computer, comprising software code portions for performing the steps according to claim 1, when said computer program product is running on a computer.

* * * * *